Patented July 1, 1952

2,602,070

UNITED STATES PATENT OFFICE 2,602,070

PROCESS FOR THE PREPARATION OF PURE NICKEL HYDROXIDE

William John Kirkpatrick, Pittsburgh, Pa., assignor to The International Nickel Company, Inc., New York, N. Y., a corporation of Delaware No Drawing. Application September 15, 1950, Serial No. 185,140

10 Claims. (Cl. 252—472)

1

The present invention relates to a new and improved process for the preparation of pure nickel hydroxide, and more particularly, to an improved process for the preparation of nickel hydroxide of small crystallite size substantially devoid of other chemical elements, foreign cations, and foreign anions, to provide pure nickel hydroxide in a state suitable for use in various chemical industries.

It is well known that nickel hydroxide can be precipitated by mixing together a nickel salt or solution of a nickel salt with an alkali metal hydroxide or a solution of an alkali metal hydroxide. Heretofore, the nickel hydroxide precipitate produced by the known chemical reaction methods has been washed with water in an attempt to remove the impurities therefrom. However, it has been impossible to prevent contamination of nickel hydroxide, produced heretofore, by absorption of foreign elements, and adsorption of foreign anions and cations such as sodium, potassium, sulfate, etc. The use of large volumes of water in washing nickel hydroxide aggravates the condition of contamination. It is well known that in order to obtain a nickel hydroxide product which possesses maximum solubility in water, which possesses maximum reactivity towards acids and organic reagents, and which is capable of being reduced to nickel oxide or metallic nickel possessing maximum catalytic activity, the nickel hydroxide employed in various chemical industries must be substantially pure and devoid of adsorbed and/or absorbed contaminating foreign elements, substances, compounds, anions, or cations and must be in a finely divided state, i. e., small crystallite size. Nickel hydroxide possessing rather high purity has been produced electrolytically by corrosion of nickel anodes in alkaline anolytes, but this method is expensive, and has not proved entirely successful. Although many attempts were made to produce nickel hydroxide substantially devoid of contaminants, and of a desirable crystalline structure for various industries, none so far as I am aware was entirely successful when carried into practice commercially on an industrial scale.

It has now been discovered that substantially pure nickel hydroxide can be produced by a chemical reaction process which will provide nickel hydroxide substantially devoid of foreign elements, compounds, anions, and cations and which will possess structural qualities demanded for good chemical reactivity and catalytic activity in various chemical industries.

2

It is an object of the present invention to provide a process for the production of pure nickel hydroxide which possesses excellent chemical reactivity, maximum water solubility, and capability of reduction to yield catalysts of excellent catalytic activity.

Another object of the invention is to provide a process for the production of nickel hydroxide substantially devoid of foreign elements, compounds, substances, cations, and anions.

The invention also contemplates providing a process for the production of pure nickel hydroxide substantially devoid of alkali metal cations introduced by the reaction mixture and which may be absorbed and/or adsorbed by the nickel hydroxide during the chemical reaction employed in producing nickel hydroxide.

Generally speaking, the present invention contemplates a process for producing nickel hydroxide substantially devoid of contaminating impurities and possessing special structural characteristics. The process comprises reacting a nickel salt with a water soluble hydroxide, under conditions such that the reaction mixture is maintained at a pH above about 12.5. The nickel hydroxide is then separated from the solution and is treated with a substantially anhydrous organic solvent to extract contaminants, including foreign salts, compounds and elements, adsorbed alkali, cations, and anions introduced or produced during the reaction. The resulting nickel hydroxide precipitate provided after extraction with a substantially anhydrous organic solvent is separated from the solvent to provide nickel hydroxide substantially devoid of contaminants and possessing special structural characteristics, including extremely small crystallite size.

In carrying the invention into practice, it is essential that the pH of the reaction mixture composed of nickel salt and water soluble hydroxide, such as an alkali metal hydroxide, be maintained at a pH above about 12.5. When the pH is allowed to go below about 12.5, the formation of the crystalline structure of the nickel hydroxide is such as to adsorb, absorb, and "lock in" foreign compounds, elements, anions, cations, and impurities. However, when the pH is maintained above about 12.5, the structural characteristics of the nickel hydroxide are such that a minimum of impurities are adsorbed on or "locked in" the nickel hydroxide. When the pH is maintained above about 12.5, nickel hydroxide is produced having such a structure that when it is treated in accordance with the process described hereinbefore substantially all of the impurities and contaminants are removed from the nickel hydroxide precipitate.

When nickel hydroxide is initially produced from the reaction mixture of nickel salt and water soluble hydroxide, such as an alkali metal hydroxide, according to my invention the precipitate is not washed with water, is not dialyzed with water and is not treated with ion exchangers in the presence of water, for when the nickel hydroxide is washed with water the crystallographic structure of the nickel hydroxide so produced is such that contaminants, e. g., foreign anions, cations, compounds, etc., are adsorbed, absorbed, and "locked in" so that they can not be substantially removed. In accordance with my invention, the nickel hydroxide is treated with a substantially anhydrous organic solvent, preferably employing a refluxing or such continuous extraction apparatus, to extract foreign substances, foreign anions, cations, and contaminants from the nickel hydroxide. This treatment provides removal of substantially all of the foreign contaminants from the nickel hydroxide.

Various water soluble hydroxides or bases are employed in the process to react with nickel salt to produce nickel hydroxide. The hydroxides or bases employed in the reaction are those hydroxides selected from the group consisting of potassium hydroxide, sodium hydroxide, cesium hydroxide, rubidium hydroxide, lithium hydroxide, tetraalkylammonium hydroxides, tetraalkylolammonium hydroxides, and tetraarylammonium hydroxides. The water soluble hydroxides or bases preferably employed in the reaction to produce nickel hydroxide are potassium hydroxide, sodium hydroxide, tetramethylammonium hydroxide, tetraethanolammonium hydroxide, tetraphenylammonium hydroxide, tetrabenzylammonium hydroxide, N-trialkyl anilinium hydroxide, N,N'-trimethyl ethylenediammonium hydroxide, N-alkyl pyridinium hydroxide, and N-dialkyl piperidinium hydroxide.

The inorganic alkali metal hydroxides employed as the alkaline compound in the reaction mixture to produce nickel hydroxide, according to the process described hereinbefore, are preferably those water soluble highly ionizable alkali metal hydroxides selected from the group consisting of potassium hydroxide, sodium hydroxide, cesium hydroxide, rubidium hydroxide, and lithium hydroxide. The preferred inorganic alkali metal hydroxides are those selected from the group consisting of potassium hydroxide and sodium hydroxide. The inorganic alkali metal hydroxides employed in the process are suitably employed as concentrated aqueous solutions having a concentration of from about 110 g. p. l. to about 700 g. p. l., measure at about 30° C. The suitable preferred concentration is from about 200 g. p. l. to about 500 g. p. l. In this specification, the abbreviation "g. p. l." has the meaning "grams per liter of solution."

Strong organic bases can also be employed in carrying out the reaction described hereinbefore. The organic bases which are suitably employed are those inorganic bases selected from the group consisting of tetraalkylammonium hydroxides, tetraarylammonium hydroxides, and tetraalkylolammonium hydroxides. The preferred organic hydroxides employed are tetramethylammonium hydroxide, tetraethanolammonium hydroxide, tetraphenylammonium hydroxide, tetrabenzylammonium hydroxide, N-trialkyl anilinium hydroxide, N,N'-trimethyl ethylenediammonium hydroxide, N-alkyl pyridinium hydroxide, and N-dialkyl piperidinium hydroxide. The organic bases employed in the process are suitably employed in aqueous solution having a concentration of from about 0.05 gram-molecules per liter to about 1 gram-molecules per liter with the essential qualification that in all cases the pH of the reaction mixture be substantially above about 12.5.

In carrying out the chemical reaction between a water soluble hydroxide and a salt of nickel, those salts of nickel are employed which are at least slightly soluble in water and which react with the water soluble hydroxides described hereinbefore to produce the relatively insoluble nickel hydroxide. The salts of nickel which may be suitably employed are nickel salts of inorganic acids such as chlorides, bromides, chlorates, perchlorates, nitrates, sulfites, sulfates, and nickel salts of organic acids such as formates, acetates, propionates, oxalates, malonates, maleates, succinates, tartrates, and benzoates. It is preferable to employ such nickel salts as nickel nitrate, nickel tartrate, acetate or formate.

The organic solvent employed in extracting the contaminants, such as excess potassium hydroxide and the salts formed by metathesis, must have the property of being a solvent for the water soluble hydroxides, such as alkali metal hydroxides, and the salts formed during the chemical reaction. Low molecular weight alcohols, ethers, and low cyclic ethers are the preferred organic extraction solvents employed. The organic solvents employed in extracting impurities from the nickel hydroxide are those organic solvents selected from the group consisting of ethanol, alcohols with 1 to 5 carbon atoms and their ethers, furanes and hydrofuranes, pyrans and hydropyrans, and ketones with 1 to 6 carbon atoms. The organic solvents preferably employed are methanol, ethanol and diethyl ether.

It is important that the organic solvents employed in extracting impurities and contaminants be substantially anhydrous and remain substantially anhydrous throughout the practice of the extraction phase of the process. The organic solvent can be maintained substantially anhydrous by introducing a dehydrator, such as calcium oxide, boric oxide, copper sulfate, etc., into the refluxing, extraction apparatus in order to maintain anhydrous the organic solvent, or the solvent may be maintained anhydrous by azeotropic distillation of the main stream or a by-passed portion thereof.

The extraction phase of the process, wherein the organic extraction solvent is employed in removing contaminants from the nickel hydroxide, is performed between the freezing point and the boiling point of the organic solvent. However, the temperature during the extraction operation preferably should not exceed the decomposition point of nickel hydroxide, i. e., above about 150 C. The extraction operation may be carried out under elevated pressure, e. g., at a pressure from about 1 to about 100 atmospheres. The preferred pressure at which the extraction is performed is from about 1 to about ten atmospheres. The extraction operation may be carried out by placing the initial nickel hydroxide containing the contaminants within a refluxing extraction apparatus containing in the extraction chamber one or more of the anhydrous organic solvents described hereinbefore, and the precipitate treated with the said solvents.

Occluded water, if present, may be extracted from the nickel hydroxide and provision can be made for continuously removing this water from the organic solvent employed in the process as described hereinbefore, for removing water initially present in the organic solvent.

When practicing the process described hereinbefore, if the desired final product is a supported catalyst, a suitable carrier or support material such as pumice or other porous siliceous glasses, diatomaceous earth or other finely divided forms of silica including true tripoli, alumina in its several modifications, nickel aluminate, zirconium dioxide, carbon and other refractory materials capable of withstanding solution of pH 12.5 may be dispersed within the chemical reaction mixture. The nickel hydroxide produced during the chemical reaction between nickel salt and water soluble hydroxide is deposited upon the support or carrier material. The solid carrier material having the nickel hydroxide thereon is then separated from the reaction mixture and treated in accordance with the process described hereinbefore. The impurities and contaminants are removed by extraction with said anhydrous organic solvents and substantially pure nickel hydroxide carried by the suitable support is then produced. This material can then be treated by reduction methods to produce a supported nickel catalyst substantially devoid of impurities and contaminants produced during the chemical reaction. This supported nickel catalyst may be sulfided with hydrogen sulfide to produce a highly active supported nickel subsulfide ($Ni_3S_2$) catalyst.

For the purpose of giving those skilled in the art a better understanding of the invention, the following illustrative examples are given:

*Example I*

About 41 grams of nickel tartrate were ground to a thin paste with a small amount of water. This paste or slurry was stirred into a solution of about 45 grams of potassium hydroxide in 20 milliliters (ml.) of water. The mixture was agitated to provide a solution or colloidal dispersion which was green in color. The solution was filtered through asbestos to remove any unreacted nickel tartrate, which remains on the filter. The resulting solution or colloidal dispersion was dried under vacuum at room temperature. The resulting gel-like clear, and transparent solid was broken into lumps about the size of barley grains. The grains were introduced into a Soxhlet refluxing extraction apparatus containing hot absolute ethyl alcohol in the boiler and the precipitate extracted with the alcohol. No foreign anions or cations, especially potassium, could be detected spectroscopically in the precipitate after the extraction operation. This nickel hydroxide was amorphous, giving no X-ray diffraction pattern with "Copper K alpha" radiation. It was dehydrated in vacuo to nickel oxide at 250° C. This nickel oxide was also amorphous.

*Example II*

About 145 grams of nickel nitrate hexahydrate were dissolved in 100 milliliters of freshly boiled distilled water. This solution was added dropwise with vigorous stirring to a solution containing about 100 grams of potassium hydroxide in 100 milliliters of distilled water. The reaction was carried out in a nickel container. The precipitate produced by the chemical reaction was separated from most of the liquid by centrifuging. The precipitate was then introduced into an evaporating container in a vacuum desiccator and dried. After drying, the precipitate was broken into small lumps and placed in the "thimble" of a Soxhlet refluxing apparatus. The Soxhlet boiler contained anhydrous ethanol which was kept anhydrous by means of calcium oxide in the boiler of the extraction apparatus. The impurities, such as nitrates, potassium hydroxide, residual water, foreign anions, cations, etc., were extracted from the precipitate by extraction with the ethanol. After extraction, the nickel hydroxide had the appearance of a bright apple-green gel. The surface area of this nickel hydroxide gel was found to be 265 square meters per gram after drying at 60° C. The gel was dehydrated to nickel oxide at 250° C. and was found to have a surface area of 325 square meters per gram. The Crystallites of nickel hydroxide were found to have a dimension of less than about 25 Ångstrom units as determined from broadening of the (002) diffraction maximum in the X-ray diffraction pattern using the powder method. Thus, pure nickel hydroxide was produced which possessed excellent surface area, and fine Crystallites, upon dehydration, for maximum catalytic activity.

Various industries employ compounds of nickel which are produced by treating nickel hydroxide. For example, nickel hydroxide produced in accordance with my process can be dehydrated to nickel oxide and the nickel oxide employed in the Edison Alkaline Storage Cells, such as the nickel-iron storage cell and the nickel-cadmium storage cell. Also, in the industries employing nickel oxide or nickel as catalysts, the nickel oxide or nickel is produced by dehydrating or reducing nickel hydroxide. The industry has sought nickel hydroxide substantially devoid of contaminants and having a crystalline structure such that, when reduced to nickel oxide or nickel, the resulting crystals of nickel oxide and/or nickel will be substantially devoid of contaminants and will have a crystalline structure which possesses maximum surface contact area and catalytic activity. The prior art methods of producing nickel hydroxide have failed to provide nickel hydroxide substantially devoid of impurities, but the process described hereinbefore as my invention provides nickel hydroxide substantially devoid of contaminants, said nickel hydroxide being reducible to nickel oxide and nickel substantially devoid of contaminants. Furthermore, prior art processes have produced nickel hydroxide having a crystalline structure such that the surface contact area of the crystals has been limited. The prior art production of nickel hydroxide has provided nickel hydroxide having crystal sizes of an average of not less than about 100 Ångstroms. The prior art nickel hydroxide, when reduced to nickel oxide, produced crystals having an average size of not less than about 90 Ångstroms; and when reduced to nickel, the crystals have an average size of from about 400 to about 1900 Ångstroms. The prior art nickel hydroxide surface contact area has measured a maximum of about 10 square meters per gram. The production of nickel hydroxide according to the process described in my invention provides nickel hydroxide of crystal sizes of less than about 25 Angstroms. These nickel hydroxide crystals when reduced to nickel oxide provide nickel oxide crystals possessing an average size of less than about 25 Ångstroms. Furthermore, the maximum surface contact area of the nickel hydroxide is as high as about 260 square meters per gram and that of the nickel oxide produced therefrom as high as about 340 square meters per gram. The crystalline structure of nickel hydroxide produced according to the process described hereinbefore provides crystals which upon reduction to nickel oxide or nickel have excellent surface area and the overall qualities demanded by various chemical industries are excellent.

The extraction phase of this process, employing an organic solvent as the extraction agent, can also be applied to nickel hydroxide precipitate formed electrolytically in an alkaline anolyte.

Where it is desired to speed up the extraction of potassium ions adsorbed on the surface of the nickel hydroxide, organic bases such as trimethylamine may be added to the organic solvent used in the extraction.

It is to be observed that the present invention provides nickel hydroxide substantially devoid of contaminants, which upon reduction to nickel oxide yields a catalyst having high catalytic surface area and activity.

Furthermore, the invention provides a process for producing pure nickel hydroxide precipitate which is free of adsorbed or otherwise contaminating foreign anions, cations, and other impurities.

Moreover, the invention provides pure nickel hydroxide precipitate which will have maximum solubility in water, maximum reactivity towards acids and organic reagents, and good crystallographic properties for producing catalysts having maximum catalytic surface area and activity.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims. For example, cobalt is considered an equivalent of nickel in the process described hereinbefore.

I claim:

1. A process for producing nickel hydroxide substantially devoid of contaminants comprising reacting a water soluble hydroxide with a salt of nickel at a pH above about 12.5 to produce nickel hydroxide, separating said nickel hydroxide from solution, treating the separated nickel hydroxide with a substantially anhydrous organic solvent selected from the group consisting of alcohols with 1 to 5 carbon atoms and their ethers, furanes and hydrofuranes, pyrans and hydropyrans, and ketones with 1 to 6 carbon atoms to extract the contaminants from said nickel hydroxide, and separating the nickel hydroxide from said organic solvent.

2. A process for producing nickel hydroxide substantially devoid of contaminants and possessing fine Crystallite size comprising reacting a water soluble hydroxide with a salt of nickel at a pH above about 12.5 to produce nickel hydroxide, separating said nickel hydroxide from solution while maintaining the solution at a pH above about 12.5, extracting the contaminants from the separated nickel hydroxide by treating the nickel hydroxide with a substantially anhydrous organic solvent selected from the group consisting of alcohols with 1 to 5 carbon atoms, and their ethers, furanes and hydrofuranes, pyrans and hydropyrans, and ketones with 1 to 6 carbon atoms, and separating the nickel hydroxide from the organic solvent.

3. A process for producing a supported nickel catalyst substantially devoid of contaminants comprising reacting a water soluble hydroxide with a nickel salt in the presence of a refractory carrier material at a pH above about 12.5 to produce nickel hydroxide supported by the carrier material, separating the carrier-supported nickel hydroxide from solution, treating the carrier-supported nickel hydroxide with a substantially anhydrous organic solvent selected from the group consisting of alcohols with 1 to 5 carbon atoms, and their ethers, furanes and hydrofuranes, pyrans and hydropyrans, and ketones with 1 to 6 carbon atoms to extract the contaminants from said supported nickel hydroxide, separating said supported nickel hydroxide from said organic solvent.

4. A process for producing pure nickel hydroxide which comprises producing nickel hydroxide by reacting a water soluble hydroxide with a nickel salt at a pH above about 12.5 and thereafter, without intermediate water washing of said nickel hydroxide, extracting impurities from said nickel hydroxide with a substantially anhydrous organic solvent for water soluble hydroxides and salts formed during the reaction to produce nickel hydroxide of high purity characterized by fine Crystallite size and high surface area.

5. A process for producing a nickel hydroxide substantially devoid of contaminants comprising reacting a water soluble hydroxide with a nickel salt at a pH above about 12.5 to produce nickel hydroxide, separating said nickel hydroxide from solution, treating the separated nickel hydroxide with a substantially anhydrous organic solvent for water soluble hydroxides and salts formed during the reaction to extract the contaminants from said nickel hydroxide, and separating the nickel hydroxide from said organic solvent.

6. A process for producing a nickel hydroxide substantially devoid of contaminants comprising reacting a water soluble hydroxide with nickel nitrate at a pH above about 12.5 to produce nickel hydroxide, separating said nickel hydroxide from solution, treating the separated nickel hydroxide with a substantially anhydrous organic solvent for water soluble hydroxides and salts formed during the reaction to extract the contaminants from said nickel hydroxide, and separating the nickel hydroxide from said organic solvent.

7. A process for producing a nickel hydroxide substantially devoid of contaminants comprising reacting a water soluble hydroxide with nickel chloride at a pH above about 12.5 to produce nickel hydroxide, separating said nickel hydroxide from solution, treating the separated nickel hydroxide with a substantially anhydrous organic solvent for water soluble hydroxides and salts formed during the reaction to extract the contaminants from said nickel hydroxide, and separating the nickel hydroxide from said organic solvent.

8. A process for producing a nickel hydroxide substantially devoid of contaminants comprising reacting a water soluble hydroxide with nickel tartrate at a pH above about 12.5 to produce nickel hydroxide, separating said nickel hydroxide from solution, treating the separated nickel hydroxide with a substantially anhydrous organic solvent for water soluble hydroxides and salts formed during the reaction to extract the contaminants from said nickel hydroxide, and separating the nickel hydroxide from said organic solvent.

9. A process for producing a nickel hydroxide substantially devoid of contaminants comprising reacting a water soluble hydroxide with nickel acetate at a pH above about 12.5 to produce nickel hydroxide, separating said nickel hydroxide from solution, treating the separated nickel hydroxide with a substantially anhydrous organic solvent for water soluble hydroxides and salts formed during the reaction to extract the contaminants from said nickel hydroxide, and separating the nickel hydroxide from said organic solvent.

10. A process for producing a nickel hydroxide substantially devoid of contaminants comprising reacting a water soluble hydroxide with nickel bromide at a pH above about 12.5 to produce nickel hydroxide, separating said nickel hydroxide from solution, treating the separated nickel hydroxide with a substantially anhydrous organic solvent for water soluble hydroxides and salts formed during the reaction to extract the contaminants from said nickel hydroxide, and separating the nickel hydroxide from said organic solvent.

WILLIAM JOHN KIRKPATRICK.

REFERENCES CITED

The following references are of record in the file of this patent:

UNITED STATES PATENTS

| Number | Name | Date |
|---|---|---|
| 1,232,830 | Morey et al. | July 10, 1917 |
| 2,422,671 | Haensel et al. | June 24, 1947 |